United States Patent
Fertl et al.

(10) Patent No.: US 10,356,846 B2
(45) Date of Patent: Jul. 16, 2019

(54) PICONET BASE STATION AND COMMUNICATION SYSTEM FOR A VEHICLE

(71) Applicant: Bayerische Motoren Werke Aktiengesellschaft, Munich (DE)

(72) Inventors: Peter Fertl, Munich (DE); Michael Schraut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1266 days.

(21) Appl. No.: 13/900,202

(22) Filed: May 22, 2013

(65) Prior Publication Data
US 2013/0337872 A1   Dec. 19, 2013

(30) Foreign Application Priority Data
May 23, 2012   (DE) .................. 10 2012 208 641

(51) Int. Cl.
| H04W 88/08 | (2009.01) |
| H04B 7/155 | (2006.01) |
| H04W 16/26 | (2009.01) |

(52) U.S. Cl.
CPC ........ H04W 88/08 (2013.01); H04B 7/15507 (2013.01); H04W 16/26 (2013.01)

(58) Field of Classification Search
None
See application file for complete search history.

(56) References Cited

U.S. PATENT DOCUMENTS

| 2007/0155381 A1* | 7/2007 | Alberth ................ H04W 48/10 455/432.1 |
| 2010/0165960 A1 | 7/2010 | Richardson |
| 2010/0234071 A1* | 9/2010 | Shabtay ............... H04B 7/0408 455/562.1 |
| 2011/0264799 A1* | 10/2011 | Poivert-Becq ...... H04L 43/0882 709/224 |

(Continued)

FOREIGN PATENT DOCUMENTS

| DE | 10 2007 029 952 A1 | 1/2009 |
| WO | WO 02/17660 A2 | 2/2002 |

OTHER PUBLICATIONS

German Search Report with English Translation dated Jan. 22, 2013 (ten (10) pages).

*Primary Examiner* — Mohammed Rachedine
(74) *Attorney, Agent, or Firm* — Crowell & Moring LLP (57) ABSTRACT

An ultra-small cell base station for a vehicle is coupleable, for signal exchange, to a first antenna assembly, which is configured to receive radio signals of a cellular radio user device situated inside the vehicle and to emit radio signals to be received by the user device. The ultra-small cell base station is also coupleable to a second antenna assembly, configured to receive radio signals of a further cellular radio user device situated outside the vehicle and to emit radio signals to be received by the further user device. The ultra-small cell base station is also coupleable to a network-side antenna assembly of the vehicle configured to receive radio signals emitted by a pre-defined static cellular radio base station and to emit radio signals to be received by the static base station. The ultra-small cell base station is configured to operate a first and a second small cell.

19 Claims, 4 Drawing Sheets

(56) References Cited

U.S. PATENT DOCUMENTS

| | | | | |
|---|---|---|---|---|
| 2012/0112697 A1* | 5/2012 | Heuer | ................ | B60L 11/1818 |
| | | | | 320/109 |
| 2012/0242510 A1* | 9/2012 | Choi | ................ | G01C 21/3688 |
| | | | | 340/988 |
| 2013/0315134 A1* | 11/2013 | Halfmann | ........... | H04W 84/047 |
| | | | | 370/315 |

* cited by examiner

PICONET BASE STATION AND COMMUNICATION SYSTEM FOR A VEHICLE

BACKGROUND AND SUMMARY OF THE INVENTION

The invention relates to an ultra-small cell base station for a vehicle, a method and device for operating said ultra-small cell base station and a communication system for the vehicle.

Cellular radio networks have a grouping of static radio base stations which spread a network of radio cells in order to ensure radio provision for cellular radio terminal devices. Through intelligent network planning, the greatest possible coverage of the area is achieved. The radio base stations are linked by means of a wire-bound connection, also known as backhaul, to a core network. The radio cells of the cellular radio network can have different sizes. Depending on the size thereof, the cells are designated macrocells, microcells, picocells or femtocells.

It is an object of the invention to provide an ultra-small cell base station for a vehicle, a method and a device for operating said ultra-small cell base station and a communication system for the vehicle, which enable flexible operation of more than one radio cell.

This aim is achieved by means of the features of the independent claims. Advantageous developments of the invention are disclosed in the subclaims.

According to a first aspect, the invention is characterized by an ultra-small cell base station for a vehicle. The ultra-small cell base station can be coupled, for signal exchange, to a first antenna assembly of the vehicle, which is configured and arranged to receive radio signals of at least one cellular radio user device which is situated in an interior space of the vehicle and to emit radio signals such that said signals can be received by the cellular radio user device. The ultra-small cell base station can also be coupled, for signal exchange, to a second antenna assembly of the vehicle, which is configured and arranged to receive radio signals of at least one further cellular radio user device which is situated in a pre-defined surrounding region outside the vehicle and to emit radio signals such that said signals can be received by the further cellular radio user device. The ultra-small cell base station can also be coupled, for signal exchange, to at least one network-side antenna assembly of the vehicle, which is configured and arranged to receive radio signals emitted by a pre-defined static cellular radio base station and to emit radio signals such that said signals can be received by the static cellular radio base station. The ultra-small cell base station is configured, using the first antenna assembly and the at least one network-side antenna assembly, to operate a first small cell. The ultra-small cell base station is configured, using the second antenna assembly and the at least one network-side antenna assembly and/or a further network-side antenna assembly, to operate a second small cell.

Advantageously, this enables flexible local and/or temporal adaptation of a cellular radio network capacity to an actually demanded network-covering requirement and/or data rate requirement. The ultra-small cell base station has the advantage that the first and second ultra-small cell can be operated simultaneously or temporally independently of one another.

The position of the ultra-small cell base station is not fixed, but can be readily changed. This enables highly flexible operation of the first and second small cells. This can be used, for example, if complete radio provision over the whole of an area by static cellular radio base stations does not take place for technical and/or other reasons, such as for example in private households, underground car parks, tunnels, remote locations in the countryside and the like. If the vehicle is situated in such a location, the ultra-small cell base station can operate the second small cell. This enables at least improved radio provision for this location, including for users of the cellular radio network outside the vehicle.

Furthermore, the ultra-small cell base station can be operated independently of the time-dependent demands placed on the radio provision. This ability can be utilized, for example, if a current network coverage requirement and/or a data rate requirement can be met by static cellular radio base stations for technical and/or other reasons, for example, due to daytime or nighttime demand variations and/or due to temporally and locally limited occurrences, for example, in a traffic jam where many people wish to use the radio network infrastructure simultaneously at one location. If, at this time, the vehicle is accidentally or deliberately situated in said local region, the ultra-small cell base station can operate the second ultra-small cell so that at least an improved radio provision is also made available to users outside the vehicle.

Complex adaptation of the antenna alignment and/or of a transmitting power at the static cellular radio base stations in order to provide the required network capacity can be at least partially dispensed with. Furthermore, this means that at least partially static cellular radio base stations are not necessary or can be configured with a lower power output. In this way, equipment costs and/or site rental costs can be saved.

The ultra-small cell base station can be configured, for example, as a femto base station and/or as a pico base station. For example, the ultra-small cell base station can be configured to operate the first small cell, which comprises the passenger compartment of the vehicle, as a femtocell and to operate the second small cell, which comprises a pre-defined surrounding region outside the passenger compartment of the vehicle, as a femtocell or as a picocell.

The ultra-small cell base station can be configured to operate the first and second ultra-small cell such that the first and second ultra-small cell use the same carrier frequency. Alternatively or in addition, the ultra-small cell base station can be configured to operate the first and second small cells such that the first and second small cells use different carrier frequencies. The ultra-small cell base station can be configured to operate the first and second small cells such that the first and second small cells use the same carrier frequency but different scrambling codes. The first and second small cells are preferably spatially separate or substantially spatially separate. The first ultra-small cell can enable radio coverage in the passenger compartment and the second ultra-small cell can enable radio coverage in a pre-defined surrounding region outside the vehicle.

The ultra-small cell base station can be configured such that said base station can be coupled directly, without the interconnection of a further processing device, to the at least one network-side antenna assembly. Alternatively or additionally, the ultra-small cell base station can be coupled, for signal exchange, via a communication module assigned to the ultra-small cell base station, to the at least one network-side antenna assembly. The ultra-small cell base station can be electrically coupled, via a wire-bound connection, to the communication module and the communication module can be electrically coupled to the network-side antenna assembly. In this case, the ultra-small cell base station can be configured simplified such that said base station does not have the functionality for a wireless connection to the cellular radio network via a radio interface to a network-side base station. Rather, the communication module is configured to create the wireless connection to the cellular radio network via the radio interface to the network-side base station.

The respectively pre-defined cellular radio base station which receives the radio signals from the network-side antenna assembly can change depending on the position of the ultra-small cell base station. The pre-defined static cellular radio base station is the respective cellular radio base station which is associated with a pre-defined region in which the ultra-small cell base station is currently located.

In an advantageous embodiment according to the first aspect, the ultra-small cell base station is configured, depending on a pre-defined activation signal, to operate the second small cell. Depending on the activation signal, the second small cell, which covers a pre-defined radio coverage region outside the vehicle, can be operated. The second ultra-small cell can be made available to other cellular radio users outside the vehicle or at least outside the passenger compartment for radio connection to a pre-defined cellular radio network.

In a further advantageous embodiment according to the first aspect, the ultra-small cell base station has a cable-connected interface to link the ultra-small cell base station, for signal exchange, to a cable-connected communication network outside the vehicle. Advantageously, this enables a cable-bound backhaul connection to be used and the signals received from the cellular radio terminal devices to be transmitted via the cable-bound connection to the core network and/or enables network-side signals that are to be transmitted to the cellular radio terminal devices to be transmitted from the core network, via the cable-bound connection, to the ultra-small cell base station. This can preferably be used when the vehicle is in a parked state.

In a further advantageous embodiment according to the first aspect, the ultra-small cell base station has a supply line communication interface for coupling, for signal exchange, of the ultra-small cell base station to a supply line communication network outside the vehicle. Advantageously, this enables a very simple connection of the ultra-small cell base station to the core network. A further advantage is that the reliability of operation of the ultra-small cell base station can be increased. The supply of energy to the ultra-small cell base station can be carried out by means of an energy store of the vehicle. By linking to the energy store of the vehicle, preferably an electric vehicle and/or hybrid vehicle, the energy supply to the ultra-small cell base station can be assured, even during long parked periods. Advantageously, the linking of the ultra-small cell base station for signal exchange and the energy-supplying coupling of the energy store to the supply network can be carried out via one coupling unit, for example, by means of a charging cable or by means of an inductive coupling.

According to a second and third aspect, the invention is characterized by a method and a corresponding device for operating the ultra-small cell base station according to the first aspect. Herein, at least one pre-defined operating variable of the vehicle is determined and/or at least one pre-defined network operating variable of a pre-defined cellular radio network to which the ultra-small cell can be coupled for signal exchange. Depending on the at least one operating variable of the vehicle and/or the at least one network operating variable, the activation signal is generated and transmitted to the ultra-small cell base station.

Advantageous embodiments of the first aspect apply also to the second and third aspect. Advantageously, the operation of the second ultra-small cell can thus be controlled by the ultra-small cell base station depending on the at least one determined operating variable and/or on the at least one network operating variable, and can thus be easily adapted to a prevailing demand.

In an advantageous embodiment according to the second and third aspect, the pre-defined operating variable represents a current position of the vehicle and/or of the ultra-small cell base station and/or an operating state of the vehicle. Advantageously, the operation of the second ultra-small cell can thus be controlled by the ultra-small cell base station depending on a current position and/or a current operating state of the vehicle.

In an advantageous embodiment according to the second and third aspects, depending on a pre-defined request message sent from outside the vehicle for the ultra-small cell base station, the activation signal is generated and transmitted to the ultra-small cell base station. Advantageously, this enables easy control of the operation of the second small cell. The second ultra-small cell can thus be activated and operated depending, for example, on a radio coverage requirement determined by a cellular radio operator. The request message can comprise, for example, network operating variables measured and/or determined by a network operator. The activation signal can be generated depending on a network operating variable of this type.

In a further advantageous embodiment of the second and third aspect, when a pre-defined activation condition for the ultra-small cell base station qualifies as being fulfilled, a pre-defined readiness message is transmitted to a central control system of a pre-defined cellular radio network operator and, depending on a request message received in response to the transmitted readiness message, the activation signal is generated and transmitted to the ultra-small cell base station. The activation condition can comprise, for example, a pre-defined function key setting in the vehicle. Advantageously, this can be used by, for example, a vehicle user to clear the operation of the second ultra-small cell for a network operation of the cellular radio network operator.

In a further advantageous embodiment according to the second and third aspect, the readiness message comprises information concerning a current position of the ultra-small cell base station. This advantageously enables easy control of an operation of the second ultra-small cell by the pre-defined cellular radio network operator.

According to a fourth aspect, the invention is characterized by a communication system for a vehicle. The communication system comprises an ultra-small cell base station according to the first aspect arranged in the vehicle. The communication system also comprises a first antenna assembly which is arranged in the vehicle and is configured and arranged to receive radio signals of at least one cellular radio user device which is situated in an interior space of the vehicle and to emit radio signals such that said signals can be received by the cellular radio user device. The communication system also comprises a second antenna assembly arranged at the vehicle, which is configured and arranged to receive radio signals of at least one further cellular radio user device situated in a pre-defined surrounding region outside the vehicle and to emit radio signals such that said signals can be received by the further cellular radio user device. The communication system also comprises at least one network-side antenna assembly arranged at the vehicle which is configured and arranged to receive radio signals transmitted by a pre-defined static cellular radio base station and to emit radio signals such that said signals can be received by the static cellular radio base station. The ultra-small cell base station is coupled, for signal exchange, to the first, the second and the network-side antenna assembly.

The coupling, for signal exchange, of the ultra-small cell base station to the first and second antenna assembly advantageously enables the first and second small cells to be easily operated by the ultra-small cell base station simultaneously or chronologically independently of one another. Advantageous embodiments of the first aspect apply also to the fourth aspect.

In an advantageous embodiment of the fourth aspect, the communication system comprises a device according to the third aspect, wherein the at least one device is coupled, for signal exchange, to the ultra-small cell base station. Advantageous embodiments of the third aspect apply also to the fourth aspect.

In a further advantageous embodiment according to the fourth aspect, an energy supply of the ultra-small cell base station is controllable depending on a detected operating state and/or a parked state of the vehicle.

In a further advantageous embodiment according to the fourth aspect, the cable-connected interface of the ultra-small cell base station can be coupled to the cable-connected communication network outside the vehicle, depending on a detected operating state and/or a detected parked state of the vehicle.

Exemplary embodiments of the invention will now be described by reference to the schematic drawings, in which.

BRIEF DESCRIPTION OF THE DRAWINGS

DETAILED DESCRIPTION OF THE DRAWINGS

Elements having the same design or function are provided in all the drawings with the same reference signs.

Figure 1:
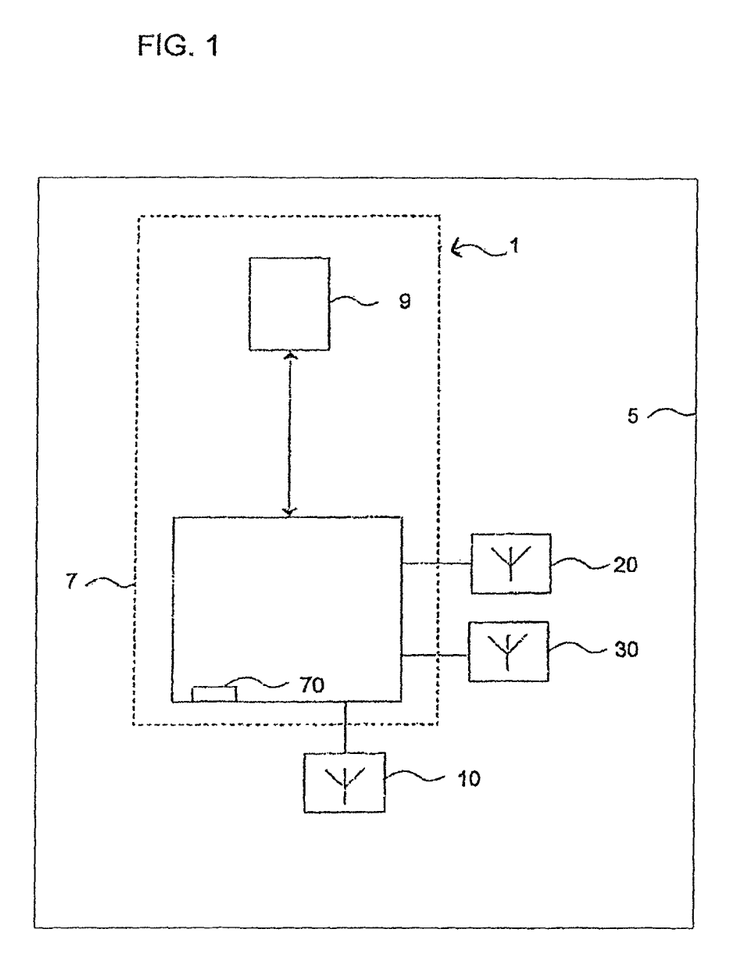
FIG. 1 is an exemplary embodiment of a communication system for a vehicle.

FIG. 1 shows a communication system 1 for a vehicle 5 together with the vehicle 5. The vehicle 5 can be configured as a motor vehicle, for example, as an automobile.

The communication system 1 has an ultra-small cell base station 7 which is arranged in the vehicle 5. The communication system 1 also comprises a first 10 and a second 20 antenna assembly and at least one network-side antenna assembly 30, said antenna assemblies being arranged in or at the vehicle 5.

The first antenna assembly 10 is configured and arranged to receive radio signals of at least one cellular radio user device which is situated in an interior space of the vehicle 5, and to emit radio signals such that said signals can be received by the cellular radio user device.

The second antenna assembly 20 is configured and arranged to receive radio signals of at least one further cellular radio user device which is situated in a pre-defined surrounding region outside the vehicle 5, and to emit radio signals such that said signals can be received by the further cellular radio user device.

The network-side antenna assembly 30 is configured and arranged to receive radio signals transmitted by a pre-defined static cellular radio base station and to emit radio signals such that said signals can be received by the static cellular radio base station.

The ultra-small cell base station 7 can be coupled, for signal exchange, to the first 10, the second 20 and the network-side antenna assembly 30.

Using the first antenna assembly 10, the ultra-small cell base station 7 receives the signals from the cellular radio terminal device or from a plurality of cellular radio terminal devices in the passenger compartment of the vehicle 5 simultaneously and transmits said signals amplified and/or converted with regard to protocol, via the network-side antenna assembly 30 to outside the vehicle 5. Transmission can be carried out according to a Wireless Local Area Network (WLAN) standard and/or a known or future cellular radio standard, for example, GSM (Global System for Mobile Communications), LTE (Long-Term Evolution), UMTS (Universal Mobile Telecommunications System), HSPA (High Speed Packet Access), CDMA200 and the like. The ultra-small cell base station 7 is configured to operate a first ultra-small cell 50 using the first antenna assembly 10 and the at least one network-side antenna assembly 30 (see FIG. 2).

The ultra-small cell base station 7 can be configured, for example, as a GSM base station or a UMTS base station and/or an LTE base station and/or a WLAN base station. The ultra-small cell base station 7 can also be configured to convert the respectively received signals with regard to protocol, for example, to communicate with GSM terminal devices based on the GSM protocol and, for example, to communicate with the static cellular radio base station on the basis of the LTE protocol.

Figure 5:
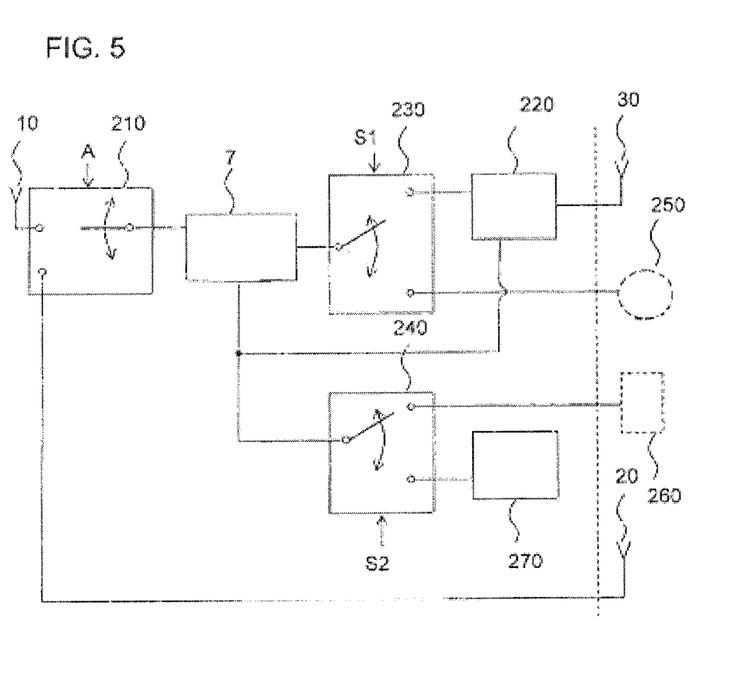
FIG. 5 is a further exemplary embodiment of the communication system.

The ultra-small cell base station 7 can have a cable-connected interface 70 for coupling, for signal exchange, of the ultra-small cell base station 7 to a cable-connected communication network 250 outside the vehicle 5 (see FIG. 5). The cable-connected interface 70 can comprise, for example, a DSL (Digital Subscriber Line) interface.

Alternatively or additionally, the ultra-small cell base station 7 can have a supply line communication interface for coupling, for signal exchange, of the ultra-small cell base station 7 to a supply line communication network outside the vehicle 5.

Alternatively or additionally, the ultra-small cell base station 7 can have an optical interface for coupling, for signal exchange, of the ultra-small cell base station 7 to the cable-connected communication network 250 outside the vehicle 5. The optical interface can comprise an infrared interface and/or a fiber-connected optical interface. The optical interface can preferably be used in a parked state of the vehicle 5.

Figure 2:
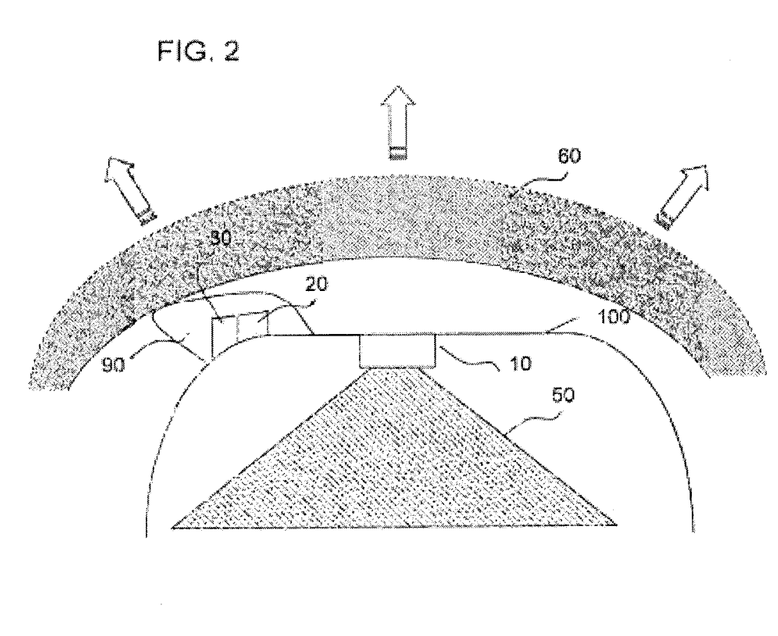
FIG. 2 is an exemplary arrangement of antenna assemblies of the communication system.

The ultra-small cell base station 7 is configured, using the second antenna assembly 20 and the at least one network-side antenna assembly 30 and/or a further network-side antenna assembly, to operate a second ultra-small cell 60 (see FIG. 2). The ultra-small cell base station 7 can be configured to operate the second ultra-small cell 60, depending on a pre-defined activation signal A. In this way, the second ultra-small cell 60 can be made available to other cellular radio users outside the vehicle 5 or at least outside the passenger compartment for radio connection to a pre-defined cellular radio network.

The communication system 1 can also comprise a device 9 for operating the ultra-small cell base station 7. Alternatively, it is possible for the device 9 to be associated with the communication system 1 and arranged outside the vehicle 5. The coupling, for signal exchange, of the device 9 to the ultra-small cell base station 7 can in this case be carried out, for example, via the cellular radio interface which couples the ultra-small cell base station 7 to the pre-defined static cellular radio base station.

The device 9 is configured to determine at least one pre-defined operating variable of the vehicle 5 and/or at least one pre-defined network operating variable of a pre-defined cellular radio network to which the ultra-small cell base station 7 can be coupled for signal exchange. Furthermore, the device 9 is configured to generate the activation signal A, depending on the at least one operating variable of the vehicle 5 and/or the at least one network operating variable, and to transmit said signal to the ultra-small cell base station 7.

The pre-defined operating variable can represent, for example, a current position of the vehicle 5 and/or a pre-set and/or predicted journey route and/or an operating state of the vehicle 5 and/or a further sensor signal from a sensor arranged in the vehicle 5, for example, a camera and/or a radar and/or a movement sensor. For example, the camera and radar sensors of the vehicle 5 can be used to detect that one or more persons who require a cellular radio connection are approaching the vehicle 5.

The pre-defined network operating variable can represent, for example: an RSRP (reference signal received power) and/or a data rate and/or an SINR (signal interference to noise ratio) and/or an RSCP (received signal code power) and/or in the case of a third generation cellular radio network, an RSSI (received signal strength power) and/or a radio coverage requirement and/or a capacity requirement of the cellular radio operator and/or an interference disruption and/or a Call-Drop-Rate and/or RSRPs of the static cellular radio base stations.

The ultra-small cell base station 7 and/or a communication module 220 of the communication system 1 can, for example, comprise suitable measuring devices which are configured to detect at least one measurement variable which is representative of the at least one network operating variable. Alternatively or additionally, particular measurement variables, for example RSRP, data rate, SINR, or the like can also be determined by the cellular radio operator using measuring techniques with the aid of the static cellular radio base stations and can be transmitted to the vehicle 5 or a database in order to derive the activation signal A therefrom.

The respective network operating variable can represent current measurement variables and/or measurement variables stored in a database, which can also be coupled with, among other things, the travel route or the current vehicle position. The database can be located in the vehicle 5 or in the core network of the cellular radio provider.

For example, the device 9 is configured to determine a current position of the vehicle 5 and/or of the ultra-small cell base station 7 and/or an operating state of the vehicle 5. Furthermore, the device 9 is configured to generate the activation signal A and to transmit said signal to the ultra-small cell base station 7, depending on the current position of the vehicle 5 and/or the ultra-small cell base station 7 and/or the operating state of the vehicle 5.

The respective current position can be transmitted, for example, by a position detecting unit of the vehicle 5 or by means of a satellite-based position detection system and transmitted to the device 9. Additionally or alternatively, it is possible that, for example, a charging station to which the vehicle 5 is coupled for energy supply is configured to transmit the position information thereof to the device 9 or to a central control device of a pre-defined cellular radio operator.

Furthermore, the device 9 can be configured to generate the activation signal A depending on a pre-defined request message for the ultra-small cell base station 7 transmitted from outside the vehicle 5, and to transmit said signal to the ultra-small cell base station 7 and/or if a pre-defined activation condition for the ultra-small cell base station 7 qualifies as being fulfilled, to transmit a pre-defined readiness message to a central control system of a pre-defined cellular radio network operator and, depending on a request message received in response to the transmitted readiness message, to transmit the activation signal A. The activation condition can comprise, for example, a pre-defined function key setting in the vehicle 5, wherein the function key can be operated, for example, by a vehicle user.

FIG. 2 shows an example of an arrangement of the first 10, second 20 and the at least one network-side antenna assembly 30 of the communication system 1. The respective antenna assemblies 10, 20, 30 can have sufficiently low coupling as a result, for example, of a suitable type selection and a suitable arrangement in the vehicle 5 or at the vehicle 5 and a suitable alignment. The first antenna assembly 10, for example, is arranged in a passenger compartment, for example, at the inside of the vehicle roof 100. In order to reduce the coupling, the first antenna assembly 10 can be configured, for example, as a circular polarized directional antenna. A directional effect of the first antenna assembly 10 is adjusted in that the transmitting and receiving energy is concentrated into the interior space. Advantageously, the vehicle bodywork can improve the electromagnetic decoupling of the passenger compartment from the space outside the vehicle. The decoupling can be further improved, for example, by means of a suitable configuration of windows of the vehicle 5, for example, by means of a metallic coating of the vehicle windows. The first antenna assembly 10 can comprise one or more antennae.

The second antenna assembly 20 can be arranged, for example, in a roof fin 90 of the vehicle 5. The second antenna assembly 20 can comprise one or more antennae.

The at least one network-side antenna assembly 30 can be configured, for example, as a controllable antenna array and can comprise a plurality of individual antennae. The network-side antenna assembly 30 can be configured, for example, to carry out beam shaping and thereby to bundle the emitted energy in the direction of the pre-defined cellular radio base station.

Furthermore, it can be provided that, depending on a detected electromagnetic coupling between the antenna assemblies 10, 20, 30, transmission power regulation of the antenna assemblies 10, 20, 30 takes place.

Figure 3:
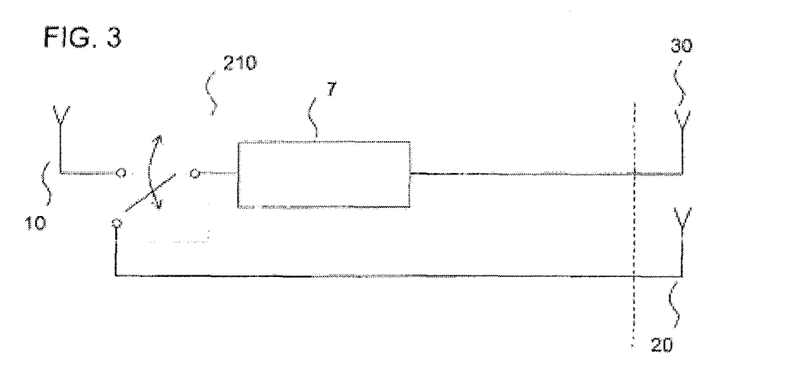
FIG. 3 is a first exemplary embodiment of a coupling, for signal exchange, of the antenna assemblies to an ultra-small cell base station.

FIG. 3 shows a first exemplary embodiment of the coupling, for signal exchange, of the first 10, second 20 and the at least one network-side antenna assembly 30 to the ultra-small cell base station 7.

In this exemplary embodiment, the ultra-small cell base station 7 comprises, for example, a relay. Said relay is configured to pass on data received from the user side and/or the network side, at least amplified. The relay is configured, for example, to process the data according to a first and second protocol layer of a pre-defined protocol. The pre-defined protocol can comprise, for example, a cellular radio protocol according to the third cellular radio generation, also known as 3G, or the fourth cellular radio generation, also known as 4G. The relay can comprise an amplifier and/or a repeater which amplifies the signals. The relay can also be a digital relay which is configured to decode the signals and then to encode and pass on said signals again.

The ultra-small cell base station 7 can comprise a first switch element 210 or the first switch element 210 can be associated with the ultra-small cell base station 7. The first switch element 210 can be configured, for example, in a first switching state, to couple the first antenna assembly 10 to the ultra-small cell base station 7 for signal exchange, and in a second switching state, to couple the second antenna assembly 20 to the ultra-small cell base station 7, for signal exchange.

The switch position of the first switch element 210 can be set, for example, depending on the activation signal A.

Figure 4:
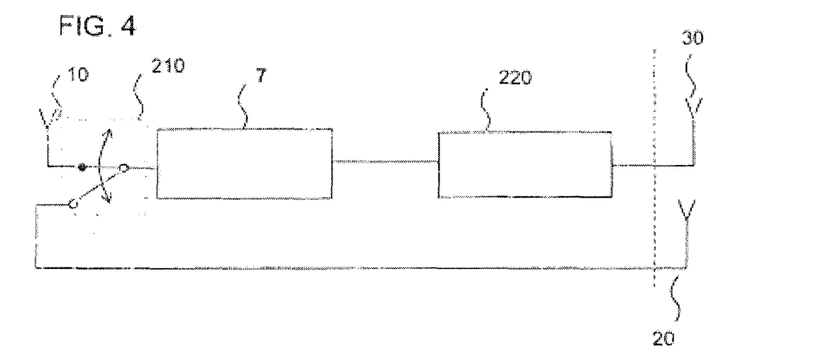
FIG. 4 is a second embodiment of a coupling, for signal exchange, of the antenna assemblies to an ultra-small cell base station.

FIG. 4 shows a second exemplary embodiment for a coupling, for signal exchange, of the first 10, second 20 and the at least one network-side antenna assembly 30 to the ultra-small cell base station 7. In the exemplary embodiment shown in FIG. 4, the communication system 1 comprises, for example, a communication module 220. The ultra-small cell base station 7 is coupled, by means of the communication module 220, for signal exchange, to the at least one network-side antenna assembly 30. For example, the ultra-small cell base station 7 is electrically coupled by means of a cable-connection, for example, an Ethernet and/or a Universal Serial Bus connection, to the communication module 220, and the communication module 220 is electrically coupled to the network-side antenna assembly 30. In this case, the ultra-small cell base station 7 is configured simplified such that said base station does not have the functionality for a wireless connection to the cellular radio network via a radio interface to a network-side base station. Rather, the communication module 220 is configured to create the wireless connection to the cellular radio network via the radio interface to the network-side base station. The communication module 220 can be configured, for example, to support protocols of the third and fourth cellular radio generations. The communication module 220 can comprise, for example, a dedicated SIM (Subscriber Identity Module) card.

The ultra-small cell base station 7 can have the first switch element 210 or the ultra-small cell base station 7 can be associated with the first switch element 210. The first switch element 210 can be configured, for example, in a first switching state, to couple, for signal exchange, the first antenna assembly 10 to the ultra-small cell base station 7 and, in a second switching state, to couple, for signal exchange, the second antenna assembly 20 to the ultra-small cell base station 7.

The switching state of the first switch element 210 can be set, for example, depending on the activation signal A.

For example, the device 9 can be configured, in order to operate the ultra-small cell base station 7, to regulate a transmitting power of the second 20 and/or the at least one network-side antenna assembly 30 depending on a required reach, in particular cell size, outside the vehicle 5. Said regulation can be carried out depending on the need of the cellular radio operator, which determines the required reach via measurements of the static cellular radio base stations thereof and/or also via network operating variables which are detected, for example, by the communication module 220 arranged in the vehicle 5.

FIG. 5 shows a further exemplary embodiment of the communication system 1. In this case, compared with the exemplary embodiment shown in FIG. 4, the communication system 1 also has a second 230 and/or third switch element 240.

In this case, an energy supply of the ultra-small cell base station 7 is controllable depending on a detected operating state and/or parked state of the vehicle 5, and/or the cable-connected interface 70 of the ultra-small cell base station 7 can be coupled to the cable-connected communication network 250 outside the vehicle 5 depending on a detected operating state and/or parked state of the vehicle 5.

The second switch element 230 is arranged, for example, between the ultra-small cell base station 7 and the communication module 220 such that, depending on a switching setting of the second switch element 230, the ultra-small cell base station 7 is coupled, for signal exchange, to the at least one network-side antenna assembly 30 and/or to the cable-connected interface 70 for coupling, for signal exchange, of the ultra-small cell base station 7 to the cable-connected communication network 250 outside the vehicle 5. The second switch element 230 can have, for example, a first and a second switching state. The switching setting of the second switch element 230 can be set to be dependent, for example, on a first control signal S1. The device 9 is configured, for example, to generate the first control signal S1 depending on an operating state and/or a parked state of the vehicle 5 and/or depending on a coupling of the vehicle 5 to a charging station and/or a coupling of the vehicle 5 to a power supply via an inductive coupling. The device 9 is also configured to transmit the first control signal S1 to the second switch element 230.

The third switch element 240 is arranged, for example, between the ultra-small cell base station 7 and the energy store of the vehicle 5 and/or between the ultra-small cell base station 7 and an alternator of the vehicle 5 such that, depending on a switching setting of the third switch element 240, the ultra-small cell base station 7 is coupled, for energy exchange, to a power supply 260 external to the vehicle or to an internal power supply 270 such as the energy store of the vehicle 5 and/or the alternator.

The third switch element 240 can have, for example, at least one first and one second switching state. The switching state of the third switch element 240 can be set, for example, to be dependent on a second switching signal S2. The device 9 is configured, for example, to generate the second control signal S2 depending on an operating state and/or a parked state of the vehicle 5 and/or depending on a coupling of the vehicle 5 to a charging station and/or a coupling of the vehicle 5 to a power supply via an inductive coupling. The device 9 is also configured to transmit the second control signal S2 to the third switch element 240.

| Table of Reference Numbers | |
| --- | --- |
| 1 | Communication system |
| 5 | Vehicle |
| 7 | Ultra-small cell base station |
| 9 | Device for operating the ultra-small cell base station |
| 10 | First antenna assembly |
| 20 | Second antenna assembly |
| 30 | Network-side antenna assembly |
| 50 | First small cell |
| 60 | Second small cell |
| 70 | Cable-connected interface |
| 90 | Roof fin |
| 100 | Vehicle roof |
| 210 | First switch element |
| 220 | Communication module |
| 230 | Second switch element |

-continued

Table of Reference Numbers

| | |
|---|---|
| 240 | Third switch element |
| 250 | Cable-connected communication network |
| 260 | External power supply |
| 270 | Internal power supply |
| A | Activation signal |
| S1 | First control signal |
| S2 | Second control signal |

The invention claimed is:

1. A method for operating an ultra-small cell base station for a vehicle, the ultra-small base station being:
  (a) coupleable, for signal exchange, to a first antenna assembly of the vehicle, which is configured and arranged to receive radio signals of at least one cellular radio user device which is situated in an interior space of the vehicle and to emit radio signals such that said signals can be received by the at least one cellular radio user device situated in the interior space of the vehicle, wherein a transmitting and receiving energy of the first antenna assembly is concentrated into the interior space of the vehicle,
  (b) coupleable, for signal exchange, to a second antenna assembly of the vehicle, which is configured and arranged to receive radio signals of at least one further cellular radio user device which is situated in a pre-defined surrounding region outside the vehicle and to emit radio signals such that said signals can be received by the at least one further cellular radio user device situated in the predefined surrounding region outside the vehicle, wherein a transmitting and receiving energy of the second antenna assembly is concentrated into the pre-defined surrounding region outside the vehicle,
  (c) coupleable, for signal exchange, to at least one network-side antenna assembly of the vehicle, which is configured and arranged to receive radio signals emitted by a pre-defined static cellular radio base station and to emit radio signals such that said signals can be received by the static cellular radio base station, wherein the pre-defined static cellular radio base station is operated by a cellular radio network operator,
and further wherein:
the ultra-small base station is:
  (a) configured, using the first antenna assembly and the at least one network-side antenna assembly, to operate a first ultra-small cell, and
  (b) configured, using the second antenna assembly and at least one network-side antenna assembly to operate a second ultra-small cell, wherein the first ultra-small cell and the second ultra-small cell are substantially spatially separate;
the method comprising the acts of:
transmitting a pre-defined readiness message from the ultra-small base station to a cellular radio network operator,
receiving a request message, in response to the pre-defined readiness message, from the cellular radio network operator, and
generating an activation signal, by a device of the vehicle, following receiving said request message, to operate the second ultra-small cell for signal exchange with the pre-defined static cellular radio base station.

2. The method according to claim 1, wherein the readiness message comprises information concerning a current position of the ultra-small cell base station.

3. The method of claim 1, further comprising:
determining at least one pre-defined operating variable of the vehicle and/or at least one pre-defined network operating variable of a pre-defined cellular radio network to which the ultra-small cell base station is coupleable for signal exchange; and
depending further on the at least one operating variable of the vehicle and/or the at least one network operating variable, generating the activation signal by the device and transmitting the activation signal to the ultra-small cell base station.

4. The method according to claim 3, wherein the pre-defined operating variable represents:
a current position of the vehicle, a current position of the ultra-small cell base station, an operating state of the vehicle, and/or a sensor signal from a sensor arranged in the vehicle.

5. The method according to claim 1, wherein the readiness message comprises information concerning a current position of the ultra-small cell base station.

6. The method according to claim 1, further comprising controlling an energy supply of the ultra-small cell base station based on a detected operating state and/or parked state of the vehicle.

7. The method according to claim 1, wherein the ultra-small cell base station has a supply line communication interface for coupling, for signal exchange, of the ultra-small cell base station to a supply line communication network outside the vehicle.

8. The method according to claim 1, further comprising linking the ultra-small cell base station for signal exchange and to an energy store of the vehicle via a single coupling unit.

9. A device of a vehicle for operating an ultra-small cell base station for a vehicle, the ultra-small base station being:
  (a) coupleable, for signal exchange, to a first antenna assembly of the vehicle, which is configured and arranged to receive radio signals of at least one cellular radio user device which is situated in an interior space of the vehicle and to emit radio signals such that said signals can be received by the at least one cellular radio user device situated in the interior space of the vehicle, wherein a transmitting and receiving energy of the first antenna assembly is concentrated into the interior space of the vehicle,
  (b) coupleable, for signal exchange, to a second antenna assembly of the vehicle, which is configured and arranged to receive radio signals of at least one further cellular radio user device which is situated in a pre-defined surrounding region outside the vehicle and to emit radio signals such that said signals can be received by the at least one further cellular radio user device situated in the predefined surrounding region outside the vehicle, wherein a transmitting and receiving energy of the second antenna assembly is concentrated into the pre-defined surrounding region outside the vehicle,
  (c) coupleable, for signal exchange, to at least one network-side antenna assembly of the vehicle, which is configured and arranged to receive radio signals emitted by a pre-defined static cellular radio base station and to emit radio signals such that said signals can be received by the static cellular radio base station,
and further wherein:

the ultra-small base station is:
(a) configured, using the first antenna assembly and the at least one network-side antenna assembly, to operate a first ultra-small cell, and
(b) configured, using the second antenna assembly and at least one network-side antenna assembly to operate a second ultra-small cell, wherein the first ultra-small cell and the second ultra-small cell are substantially spatially separate, wherein said device is configured to:
transmit a pre-defined readiness message from the ultra-small base station to a cellular radio network operator,
receive a request message, in response to the pre-defined readiness message, from the cellular radio network operator, and
generate an activation signal, following receiving said request message, to operate the second ultra-small cell for signal exchange with the pre-defined static cellular radio base station.

10. The device of claim 9, wherein said device is further configured to determine at least one pre-defined operating variable of the vehicle and/or at least one pre-defined network operating variable of a pre-defined cellular radio network to which the ultra-small cell base station is coupleable for signal exchange; and
depending further on the at least one operating variable of the vehicle and/or the at least one network operating variable, to generate the activation signal and to transmit said activation signal to the ultra-small cell base station.

11. The device according to claim 10, wherein the pre-defined operating variable represents:
a current position of the vehicle, a current position of the ultra-small cell base station, an operating state of the vehicle and/or a sensor signal from a sensor arranged in the vehicle.

12. The device according to claim 9, wherein the readiness message comprises information concerning a current position of the ultra-small cell base station.

13. The device according to claim 9, wherein the device is configured to control an energy supply of the ultra-small cell base station based on a detected operating state and/or parked state of the vehicle.

14. The device according to claim 9, wherein the ultra-small cell base station has a supply line communication interface for coupling, for signal exchange, of the ultra-small cell base station to a supply line communication network outside the vehicle.

15. The device according to claim 9, wherein a single coupling unit links the ultra-small cell base station for signal exchange and to an energy store of the vehicle.

16. A communication system for a vehicle, comprising:
an ultra-small cell base station arranged in the vehicle;
a first antenna assembly which is arranged in the vehicle and is configured and arranged to receive radio signals of at least one cellular radio user device which is situated in an interior space of the vehicle and to emit radio signals such that said signals can be received by the at least one cellular radio user device situated in the interior space of the vehicle, wherein a transmitting and receiving energy of the first antenna assembly is concentrated into the interior space of the vehicle;
a second antenna assembly arranged at the vehicle, which is configured and arranged to receive radio signals of at least one further cellular radio user device situated in a pre-defined surrounding region outside the vehicle and to emit radio signals such that said signals can be received by the at least one further cellular radio user device situated in the predefined surrounding region outside the vehicle, wherein a transmitting and receiving energy of the second antenna assembly is concentrated into the pre-defined surrounding region outside the vehicle;
at least one network-side antenna assembly arranged at the vehicle, which is configured and arranged to receive radio signals transmitted by a pre-defined static cellular radio base station and to emit radio signals such that said signals can be received by the static cellular radio base station, wherein the ultra-small cell base station is coupled, for signal exchange, to the first, the second and the network-side antenna assembly; and
a device for operating the ultra-small base station, the device being configured to:
transmit a pre-defined readiness message from the ultra-small base station to a cellular radio network operator,
receive a request message, in response to the pre-defined readiness message, from the cellular radio network operator, and
generate an activation signal, following receiving said request message, to operate the second ultra-small cell for signal exchange with the pre-defined static cellular radio base station.

17. The communication system according to claim 16, the device further being configured to:
determine at least one pre-defined operating variable of the vehicle and/or at least one pre-defined network operating variable of a pre-defined cellular radio network to which the ultra-small cell base station is coupleable for signal exchange; and
depending further on the at least one operating variable of the vehicle and/or the at least one network operating variable, generate the activation signal and to transmit said activation signal to the ultra-small cell base station,
wherein the device is coupled, for signal exchange, to the at least one ultra-small cell base station.

18. The communication system according to claim 17, wherein an energy supply of the ultra-small cell base station is controllable depending on at least one of a detected operating state and a parked state of the vehicle.

19. The communication system according to claim 18, wherein the cable-connected interface of the ultra-small cell base station is coupleable to the cable-connected communication network outside the vehicle, depending on the detected operating state and/or the detected parked state of the vehicle.

* * * * *